(12) United States Patent
Meng et al.

(10) Patent No.: US 11,932,722 B2
(45) Date of Patent: Mar. 19, 2024

(54) FORMULATED POLYOL COMPOSITIONS

(71) Applicant: Dow Global Technologies LLC, Midland, MI (US)

(72) Inventors: Qinghao Meng, Freeport, TX (US); Lucie Porcelli, Horgen (CH); David J. Honkomp, Marietta, GA (US); Meagan Broadway, Freeport, TX (US); Morgan A. Springs, Freeport, TX (US); Paul Cookson, Horgen (CH); William L. Ritter, Freeport, TX (US); Anja Arlt, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 527 days.

(21) Appl. No.: 17/282,803

(22) PCT Filed: Oct. 7, 2019

(86) PCT No.: PCT/US2019/054970
§ 371 (c)(1),
(2) Date: Apr. 5, 2021

(87) PCT Pub. No.: WO2020/076685
PCT Pub. Date: Apr. 16, 2020

(65) Prior Publication Data
US 2021/0371577 A1  Dec. 2, 2021

Related U.S. Application Data

(60) Provisional application No. 62/742,584, filed on Oct. 8, 2018.

(51) Int. Cl.
*C08G 18/48* (2006.01)
*C08G 18/76* (2006.01)
*C08G 101/00* (2006.01)

(52) U.S. Cl.
CPC ..... *C08G 18/4816* (2013.01); *C08G 18/4812* (2013.01); *C08G 18/4837* (2013.01); *C08G 18/7664* (2013.01); *C08G 2101/00* (2013.01); *C08G 2110/0008* (2021.01); *C08G 2110/0033* (2021.01); *C08G 2110/005* (2021.01); *C08G 2110/0083* (2021.01); *C08G 2350/00* (2013.01)

(58) Field of Classification Search
CPC ............ C08G 18/4812; C08G 18/4816; C08G 18/4837
See application file for complete search history.

(56) References Cited

U.S. PATENT DOCUMENTS

| | | | |
|---|---|---|---|
| 5,808,131 A | 9/1998 | Gruenbauer et al. | |
| 8,791,168 B2 | 7/2014 | Babb et al. | |
| 9,096,727 B2 | 8/2015 | Ma et al. | |
| 9,133,298 B2 | 9/2015 | Hager et al. | |
| 9,193,821 B2 | 11/2015 | Lutter et al. | |
| 9,376,526 B2 | 6/2016 | Hager et al. | |
| 9,635,963 B2 | 5/2017 | Blazar | |
| 9,670,307 B2 | 6/2017 | Neff et al. | |
| 10,316,132 B2 | 6/2019 | Cocconi et al. | |
| 2003/0195293 A1 | 10/2003 | Lubnin et al. | |
| 2004/0087675 A1 | 5/2004 | Yu | |
| 2004/0254256 A1 | 12/2004 | Lockwood et al. | |
| 2013/0085200 A1 | 4/2013 | Aou et al. | |
| 2013/0150476 A1 | 6/2013 | Martin et al. | |
| 2015/0141543 A1* | 5/2015 | Hager | C08G 18/283 521/174 |
| 2016/0135624 A1 | 5/2016 | Heidtmann et al. | |
| 2016/0264749 A1 | 9/2016 | Lindner et al. | |
| 2016/0367041 A1 | 12/2016 | Romero et al. | |
| 2017/0096518 A1 | 4/2017 | Hernandez | |
| 2017/0362375 A1 | 12/2017 | Aou et al. | |
| 2018/0140116 A1 | 5/2018 | Werner | |
| 2019/0143635 A1 | 5/2019 | Aou et al. | |
| 2019/0211171 A1 | 7/2019 | Aou et al. | |

FOREIGN PATENT DOCUMENTS

| | | |
|---|---|---|
| CN | 104093773 A | 10/2014 |
| CN | 104804212 | 7/2015 |
| CN | 106916276 | 7/2017 |
| CN | 107488252 | 12/2017 |
| CN | 108129629 | 6/2018 |
| IN | 1404492 A | 3/2003 |
| JP | 2005213414 A | 8/2005 |
| JP | 2006246956 | 9/2006 |
| JP | 2006326274 | 12/2006 |
| JP | 4817757 | 3/2007 |
| JP | 2010166943 | 8/2010 |
| KR | 100809667 B1 | 3/2008 |
| WO | 2018138047 A1 | 8/2018 |

OTHER PUBLICATIONS

International Preliminary Report on Patentability for related PCT Application PCT/US2019/054970, dated Apr. 22, 2021 (7 pgs).
International Search Report & Written Opinion for related PCT Application PCT/US2019/054970, dated Jan. 30, 2020 (11 pgs).
Jianxin , et al., "Effects of composite catalysts and open pore agent on viscoelastic polyurethane foam pore structure"; Journal of Hubei University (Natural Science), No. 03 (May 5, 2017) (6 Pgs; Original Document Only w/ English Abstract).

* cited by examiner

Primary Examiner — Michael L Leonard
(74) Attorney, Agent, or Firm — Brooks, Cameron & Huebsch, PLLC

(57) ABSTRACT

Embodiments of the present disclosure are directed towards formulated polyol compositions that include a first polyether polyol having an average hydroxyl number from 112 to 280 mg KOH/g, a second polyether polyol having an average hydroxyl number from 18.5 to 51 mg KOH/g, a third polyether polyol having an average hydroxyl number from 20 to 70 mg KOH/g, and at least one of: fourth polyether polyol having an average hydroxyl number from 112 to 280 mg KOH/g; and a methoxypolyethylene glycol having an average hydroxyl number from 56 to 190 mg KOH/g.

8 Claims, No Drawings

FORMULATED POLYOL COMPOSITIONS

This application is a National Stage Application under 35 U.S.C. § 371 of International Application Number PCT/US2019/054970, filed Oct. 7, 2019 and published as WO 2020/076685 on Apr. 16, 2020, which claims the benefit to U.S. Provisional Application 62/742,584, filed Oct. 8, 2018, the entire contents of which are incorporated herein by reference in its entirety.

FIELD OF DISCLOSURE

Embodiments of the present disclosure are directed towards formulated polyol compositions, more specifically, embodiments are directed towards formulated polyol compositions that include a first polyether polyol having an average hydroxyl number from 112 to 280 mg KOH/g, a second polyether polyol having an average hydroxyl number from 18.5 to 51 mg KOH/g, a third polyether polyol having an average hydroxyl number from 20 to 70 mg KOH/g, and at least one of: a fourth polyether polyol having an average hydroxyl number from 112 to 280 mg KOH/g; and a methoxypolyethylene glycol having an average hydroxyl number from 56 to 190 mg KOH/g.

BACKGROUND

Foams are dispersions in which a gas is dispersed in a liquid material, a solid material, or a gel material. Foams can be formed by a chemical reaction of polyols and isocyanate. Foams can be utilized for a number of various applications, including cushions, insulation, bedding, furniture, vehicle seating, and carpet backing, among others.

SUMMARY

The present disclosure provides formulated polyol compositions including a first polyether polyol having an average hydroxyl number from 112 to 280 mg KOH/g and an ethylene oxide content from 45 to 70 weight percent based upon a total weight of the first polyether polyol, wherein the first polyether polyol is from 20 to 55 weight percent of the formulated polyol composition based upon a total weight of the formulated polyol composition; a second polyether polyol having an average hydroxyl number from 18.5 to 51 mg KOH/g and an ethylene oxide content of at least 70 weight percent based upon a total weight of the second polyether polyol, wherein the second polyether polyol is from 2 to 50 weight percent of the formulated polyol composition based upon the total weight of the formulated polyol composition; a third polyether polyol having an average hydroxyl number from 20 to 70 mg KOH/g and a propylene oxide content of at least 70 weight percent based upon a total weight of the third polyether polyol, wherein the third polyether polyol is from 5 to 45 weight percent of the formulated polyol composition based upon the total weight of the formulated polyol composition; a surfactant; water; a catalyst selected from a blowing catalyst, a gel catalyst, and combinations thereof; and at least one of: a fourth polyether polyol having an average hydroxyl number from 112 to 280 mg KOH/g and a propylene oxide content of at least 70 weight percent based upon a total weight of the fourth polyether polyol, wherein the fourth polyether polyol is from 0.1 to 25 weight percent of the formulated polyol composition based upon the total weight of the formulated polyol composition; and a methoxypolyethylene glycol having an average hydroxyl number from 56 to 190 mg KOH/g, wherein the methoxypolyethylene glycol is from 0.1 to 15 weight percent of the formulated polyol composition based upon the total weight of the formulated polyol composition.

The present disclosure provides foam formulation including the formulated polyol composition and an isocyanate.

The present disclosure provides foam products formed by curing the foam formulations.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Formulated polyol compositions including a first polyether polyol having an average hydroxyl number from 112 to 280 mg KOH/g and an ethylene oxide content from 45 to 70 weight percent based upon a total weight of the first polyether polyol, wherein the first polyether polyol is from 20 to 55 weight percent of the formulated polyol composition based upon a total weight of the formulated polyol composition; a second polyether polyol having an average hydroxyl number from 18.5 to 51 mg KOH/g and an ethylene oxide content of at least 70 weight percent based upon a total weight of the second polyether polyol, wherein the second polyether polyol is from 2 to 50 weight percent of the formulated polyol composition based upon the total weight of the formulated polyol composition; and a third polyether polyol having an average hydroxyl number from 20 to 70 mg KOH/g and a propylene oxide content of at least 70 weight percent based upon a total weight of the third polyether polyol, wherein the third polyether polyol is from 5 to 45 weight percent of the formulated polyol composition based upon the total weight of the formulated polyol composition, and at least one of: a fourth polyether polyol having an average hydroxyl number from 112 to 280 mg KOH/g and a propylene oxide content of at least 70 weight percent based upon a total weight of the fourth polyether polyol, wherein the fourth polyether polyol is from 0.1 to 25 weight percent of the formulated polyol composition based upon the total weight of the formulated polyol composition; and a methoxypolyethylene glycol having an average hydroxyl number from 56 to 190 mg KOH/g, wherein the methoxypolyethylene glycol is from 0.1 to 15 weight percent of the formulated polyol composition based upon the total weight of the formulated polyol composition. are disclosed herein. Advantageously, the formulated polyol compositions disclosed herein can be utilized to form foams having a combination of properties that are advantageous for a number of applications. For instance, the formulated polyol compositions disclosed herein can be utilized to form foam products that are advantageous for cushions, e.g. pillows, seats, and mattresses and such. For instance, the formulated polyol compositions disclosed herein can form foam products that desirably form a skin, have particular foam core recovery times, particular airflow rates, and particular compression sets at 90% compression.

The formulated polyol compositions disclosed herein include a first polyether polyol. The first polyether polyol has an ethylene oxide content from 45 to 70 weight percent based upon a total weight of the first polyether polyol. All individual values and subranges from 45 to 70 weight percent are included; for example, the first polyether polyol can have an ethylene oxide content from a lower limit of 45, 50, or 55 weight percent to an upper limit of 70, 68, or 65. The first polyether polyol may include structural units derived from another alkylene oxide, e.g., propylene oxide.

The first polyether polyol can have an average hydroxyl number from 112 to 280 mg KOH/g. All individual values and subranges from 112 to 280 mg KOH/g are included; for example, the first polyether polyol can have an average hydroxyl number from a lower limit of 112, 125, or 135 mg KOH/g to an upper limit of 280, 240, or 220 mg KOH/g. Average hydroxyl number, as KOH, can be determined according to ASTM D4274.

The first polyether polyol can have an average hydroxyl functionality from 2.6 to 3.4. All individual values and subranges from 2.6 to 3.4 are included; for example, the first polyether polyol can have an average hydroxyl functionality from a lower limit of 2.6, 2.7, or 2.8 to an upper limit of 3.4, 3.3, or 3.2.

The first polyether polyol can have a number average molecular weight from 700 to 1300 g/mol. All individual values and subranges from 700 to 1300 g/mol are included; for example, the first polyether polyol can have a number average molecular weight from a lower limit of 700, 800, or 850 g/mol to an upper limit of 1300, 1200, or 1150 g/mol.

The first polyether polyol can be prepared using known equipment, reaction conditions, and reaction components.

The first polyether polyol may be obtained commercially. An example of a commercially available first polyether polyol is VORANOL™ WK 3140, available from the Dow Chemical Company, among others.

The first polyether polyol can be from 20 to 55 weight percent of the formulated polyol composition based upon a total weight of the formulated polyol composition. All individual values and subranges from 20 to 55 weight percent are included; for example, the first polyether polyol can be from a lower limit of 20, 22, or 25 weight percent to an upper limit of 55, 53, or 52 weight percent of the formulated polyol composition based upon the total weight of the formulated polyol composition.

The formulated polyol compositions disclosed herein include a second polyether polyol. The second polyether polyol has an ethylene oxide content of at least 70 based upon a total weight of the second polyether polyol. For instance, the second polyether polyol can have an ethylene oxide content from 70 to 98 weight percent based upon a total weight of the second polyether polyol. All individual values and subranges from 70 to 98 weight percent are included; for example, the second polyether polyol can have an ethylene oxide content from a lower limit of 70, 72, or 75 weight percent to an upper limit of 98, 95, 90, 88, or 85. The second polyether polyol may include structural units derived from another alkylene oxide, e.g., propylene oxide.

The second polyether polyol can have an average hydroxyl number from 18.5 to 51 mg KOH/g. All individual values and subranges from 18.5 to 51 mg KOH/g are included; for example, the second polyether polyol can have an average hydroxyl number from a lower limit of 18.5, 22, or 25 mg KOH/g to an upper limit of 51, 48, or 45 mg KOH/g.

The second polyether polyol can have an average hydroxyl functionality from 2.6 to 3.4. All individual values and subranges from 2.6 to 3.4 are included; for example, the second polyether polyol can have an average hydroxyl functionality from a lower limit of 2.6, 2.7, or 2.8 to an upper limit of 3.4, 3.3, or 3.2.

The second polyether polyol can have a number average molecular weight from 4000 to 5000 g/mol. All individual values and subranges from 4000 to 5000 g/mol are included; for example, the second polyether polyol can have a number average molecular weight from a lower limit of 4000, 4100, or 4250 g/mol to an upper limit of 5000, 4900, or 4750 g/mol.

The second polyether polyol can be prepared using known equipment, reaction conditions, and reaction components.

The second polyether polyol may be obtained commercially. An example of a commercially available second polyether polyol is VORANOL™ CP-1447 available from the Dow Chemical Company, among others.

The second polyether polyol can be from 2 to 50 weight percent of the formulated polyol composition based upon a total weight of the formulated polyol composition. All individual values and subranges from 2 to 50 weight percent are included; for example, the second polyether polyol can be from a lower limit of 2, 3, or 5 weight percent to an upper limit of 50, 45, or 40 weight percent of the formulated polyol composition based upon the total weight of the formulated polyol composition.

The formulated polyol compositions disclosed herein include a third polyether polyol. The third polyether polyol has a propylene oxide content of at least 70 based upon a total weight of the third polyether polyol. For instance, the third polyether polyol can have a propylene oxide content from 70 to 98 weight percent based upon a total weight of the third polyether polyol. All individual values and subranges from 70 to 98 weight percent are included; for example, the third polyether polyol can have a propylene oxide content from a lower limit of 70, 72, or 75 weight percent to an upper limit of 98, 95, 90, 88, or 85. The third polyether polyol may include structural units derived from another alkylene oxide, e.g., ethylene oxide. The third polyether polyol may include structural units derived from styrene-acrylonitrile, polyisocyanate, and/or polyurea.

The third polyether polyol can have an average hydroxyl number from 20 to 70 mg KOH/g. All individual values and subranges from 20 to 70 mg KOH/g are included; for example, the third polyether polyol can have an average hydroxyl number from a lower limit of 20, 25, or 30 mg KOH/g to an upper limit of 70, 65, or 60 mg KOH/g.

The third polyether polyol can have an average hydroxyl functionality from 2.6 to 3.4. All individual values and subranges from 2.6 to 3.4 are included; for example, the third polyether polyol can have an average hydroxyl functionality from a lower limit of 2.6, 2.7, or 2.8 to an upper limit of 3.4, 3.3, or 3.2.

The third polyether polyol can have a number average molecular weight from 2000 to 4000 g/mol. All individual values and subranges from 2000 to 4000 g/mol are included; for example, the third polyether polyol can have a number average molecular weight from a lower limit of 2000, 2250, or 2500 g/mol to an upper limit of 4000, 3750, or 3500 g/mol.

The third polyether polyol can be prepared using known equipment, reaction conditions, and reaction components.

The third polyether polyol may be obtained commercially. An example of a commercially available third polyether polyol is VORANOL™ 3136 available from the Dow Chemical Company, among others.

The third polyether polyol can be from 5 to 45 weight percent of the formulated polyol composition based upon a total weight of the formulated polyol composition. All individual values and subranges from 5 to 45 weight percent are included; for example, the third polyether polyol can be from a lower limit of 5, 8, or 10 weight percent to an upper limit of 45, 43, or 40 weight percent of the formulated polyol composition based upon the total weight of the formulated polyol composition.

The formulated polyol compositions disclosed herein include at least one of a fourth polyether polyol, as discussed herein, and a methoxypolyethylene glycol, as discussed herein. For instance, the formulated polyol compositions may include the fourth polyether polyol, or the methoxypolyethylene glycol, or the fourth polyether polyol and the methoxypolyethylene glycol.

The formulated polyol compositions disclosed herein may include a fourth polyether polyol. The fourth polyether polyol has a propylene oxide content of at least 70 weight percent based upon a total weight of the fourth polyether polyol. For example, the fourth polyether polyol can have a propylene oxide content from 70 to 95 weight percent based upon a total weight of the fourth polyether polyol. All individual values and subranges from 70 to 95 weight percent are included; for example, the fourth polyether polyol can have a propylene oxide content from a lower limit of 70, 72, or 75 weight percent to an upper limit of 95, 90, 88, or 85. The fourth polyether polyol may include structural units derived from another alkylene oxide, e.g., ethylene oxide.

The fourth polyether polyol can have an average hydroxyl number from 112 to 280 mg KOH/g. All individual values and subranges from 112 to 280 mg KOH/g are included; for example, the fourth polyether polyol can have an average hydroxyl number from a lower limit of 112, 125, or 135 mg KOH/g to an upper limit of 280, 240, or 220 mg KOH/g.

The fourth polyether polyol can have an average hydroxyl functionality from 2.6 to 3.4. All individual values and subranges from 2.6 to 3.4 are included; for example, the fourth polyether polyol can have an average hydroxyl functionality from a lower limit of 2.6, 2.7, or 2.8 to an upper limit of 3.4, 3.3, or 3.2.

The fourth polyether polyol can have a number average molecular weight from 500 to 1200 g/mol. All individual values and subranges from 500 to 1200 g/mol are included; for example, the fourth polyether polyol can have a number average molecular weight from a lower limit of 500, 550, or 600 g/mol to an upper limit of 1200, 1100, 1000, 900, 850, or 800 g/mol.

The fourth polyether polyol can be prepared using known equipment, reaction conditions, and reaction components.

The fourth polyether polyol may be obtained commercially. An example of a commercially available fourth polyether polyol is VORANOL™ 2070 available from the Dow Chemical Company, among others.

The fourth polyether polyol can be from 0.1 to 25 weight percent of the formulated polyol composition based upon a total weight of the formulated polyol composition. All individual values and subranges from 0.1 to 25 weight percent are included; for example, the fourth polyether polyol can be from a lower limit of 0.1, 1, or 5 weight percent to an upper limit of 25, 20, or 18 weight percent of the formulated polyol composition based upon the total weight of the formulated polyol composition. Herein, utilizing less than 0.1 weight percent of the fourth polyether polyol is considered a nominal amount of the fourth polyether polyol that is equivalent to not utilizing any of the fourth polyether polyol.

The formulated polyol compositions disclosed herein may include a methoxypolyethylene glycol. The methoxypolyethylene glycol can have an average hydroxyl number from 56 to 190 mg KOH/g. All individual values and subranges from 56 to 190 mg KOH/g are included; for example, the methoxypolyethylene glycol can have an average hydroxyl number from a lower limit of 56, 65, or 75 mg KOH/g to an upper limit of 190, 175, or 150 mg KOH/g.

The methoxypolyethylene glycol can have an average hydroxyl functionality from 0.6 to 1.4. All individual values and subranges from 0.6 to 1.4 are included; for example, the methoxypolyethylene glycol can have an average hydroxyl functionality from a lower limit of 0.6, 0.7, or 0.8 to an upper limit of 1.4, 1.3, or 1.2.

The methoxypolyethylene glycol can have a number average molecular weight from 400 to 700 g/mol. All individual values and subranges from 400 to 700 g/mol are included; for example, the methoxypolyethylene glycol can have a number average molecular weight from a lower limit of 400, 450, or 500 g/mol to an upper limit of 700, 650, or 600 g/mol.

The methoxypolyethylene glycol can be prepared using known equipment, reaction conditions, and reaction components.

The methoxypolyethylene glycol may be obtained commercially. An example of a commercially available methoxypolyethylene glycol is CARBOWAX™ MPEG 550 available from the Dow Chemical Company, among others.

The methoxypolyethylene glycol can be from 0.1 to 15 weight percent of the formulated polyol composition based upon a total weight of the formulated polyol composition. All individual values and subranges from 0.1 to 15 weight percent are included; for example, the methoxypolyethylene glycol can be from a lower limit of 0.1, 1, or 5 weight percent to an upper limit of 15, 13, or 12 weight percent of the formulated polyol composition based upon the total weight of the formulated polyol composition. Herein, utilizing less than 0.1 weight percent of the methoxypolyethylene glycol is considered a nominal amount of the methoxypolyethylene glycol that is equivalent to not utilizing any of the methoxypolyethylene glycol.

One or more embodiments provide that the formulated polyol composition has an ethylene oxide content of 20 weight percent or greater based upon a total weight of the first polyether polyol, second polyether polyol, the third polyether polyol, the fourth polyether polyol, and the methoxypolyethylene glycol, i.e., a total weight of polyol and glycol utilized in the formulated polyol composition. For instance, the formulated polyol composition can have an ethylene oxide content from a lower limit of 20, 25, 30, 35, or 40 weight percent to an upper limit of 85, 80, 75, or 70 weight percent based upon the total weight of the first polyether polyol, second polyether polyol, the third polyether polyol, the fourth polyether polyol, and the methoxypolyethylene glycol.

One or more embodiments provide that the formulated polyol composition has a composition such that a combination of the second polyether polyol, the third polyether polyol, the fourth polyether polyol, and the methoxypolyethylene glycol is less than 80 weight percent of the formulated polyol composition based upon a total weight of the first polyether polyol, second polyether polyol, the third polyether polyol, the fourth polyether polyol, and the methoxypolyethylene glycol, i.e., a total weight of polyol and glycol utilized in the formulated polyol composition. For instance, a combination of the second polyether polyol, the third polyether polyol, the fourth polyether polyol, and the methoxypolyethylene glycol can be from a lower limit of 30, 40, or 50 weight percent of the formulated polyol composition to an upper limit of 79, 75, or 70 weight percent of the formulated polyol composition based upon a total weight of the first polyether polyol, second polyether polyol, the third polyether polyol, the fourth polyether polyol, and the methoxypolyethylene glycol.

The formulated polyol compositions disclosed herein include a surfactant. Surfactants for use in the preparation of polyurethane foams are well-known to those skilled in the art, and many are commercially available. The surfactant may help to provide for uniform cell formation and/or gas entrapment, for instance. The surfactant may be a silicone surfactant, e.g., an organosilicone surfactant, a non-silicone surfactant, or a combination thereof. Examples of suitable silicone surfactants include, but are not limited to, NIAX L-620, L-618, L-5130, L-5180, L-5340, L-5440, L-6100, L-6900, L-6980, and L-6988 from Momentive; TEGOSTAB B 8427, B-8404, B-8407, B-8409, and B-8462 from Evonik; and DC-193, DC-197, DC-5582, and DC-5598 from Dow Corning. Examples of non-silicone surfactants include, but are not limited to, oxyethylated alkylphenols, oxyethylated fatty alcohols, paraffin oils, castor oil esters, ricinoleic acid esters, turkey red oil, groundnut oil, paraffins, and fatty alcohols.

The surfactant can be from 0.1 to 5.0 weight percent of the formulated polyol composition based upon a total weight of the formulated polyol composition. All individual values and subranges from 0.1 to 5.0 weight percent are included; for example, the surfactant can be from a lower limit of 0.1, 0.3, or 0.5 to an upper limit of 5.0, 4.5, or 4.0 weight percent of the formulated polyol composition based upon the total weight of the formulated polyol composition.

The formulated polyol compositions disclosed herein include water. The water may be utilized as a blowing agent, for instance. The water can be from 1 to 10 weight percent of the formulated polyol composition based upon a total weight percent of the formulated polyol composition. All individual values and subranges from 1 to 10 weight percent are included; for example, the water can be from a lower limit of 1, 2, or 3 to an upper limit of 10, 8, or 6 weight percent of the formulated polyol composition based upon the total weight of the formulated polyol composition.

The formulated polyol compositions disclosed herein include a catalyst. The catalyst may be a blowing catalyst, a gel catalyst, a trimerization catalyst, or combinations thereof. As used herein, blowing catalysts and gel catalysts, may be differentiated by a catalytic propensity to promote either the urea (blow) reaction, in the case of the blowing catalyst, or the urethane (gel) reaction, in the case of the gel catalyst. A trimerization catalyst may be utilized to promote reactivity of the compositions. One or more embodiments provide that the catalyst is selected from a blowing catalyst, a gel catalyst, or a combination thereof.

Examples of blowing catalysts, e.g., catalysts that generally promote the blow reaction include, but are not limited to, short chain tertiary amines or tertiary amines containing an oxygen. For instance, blowing catalysts include bis-(2-dimethylaminoethyl)ether; pentamethyldiethylene-triamine, triethylamine, tributyl amine, N,N-dimethylaminopropylamine, dimethylethanolamine, N,N,N',N'-tetra-methylethylenediamine, and combinations thereof, among others. Examples of commercial blowing catalysts include, but are not limited to, DABCO BL-17 from Evonik, and NIAX A1 from Momentive.

Examples of gel catalysts, e.g., catalysts that generally promote the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, N,N,N',N'-tetramethylbutanediamine, dimethylcyclohexylamine, triethylenediamine, and combinations thereof, and combinations thereof. Specific examples of commercial gel catalysts are DABCO 33-LV and DABCO T-12 from Evonik.

Examples of trimerization catalysts include tris(dialkylaminoalkyl)-s-hexahydrotriazines, such as 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof. Some commercially available trimerization catalysts include DABCO TMR, DABCO TMR-2, and DABCO TMR-30 from Evonik.

The catalyst can be from 0.01 to 5 weight percent of the formulated polyol composition based upon a total weight of the formulated polyol composition. All individual values and subranges from 0.01 to 5 weight percent are included; for example, the catalyst can be from a lower limit of 0.01, 0.1, or 0.2 to an upper limit of 5, 4.5, or 3.5 weight percent of the formulated polyol composition based upon the total weight of the formulated polyol composition.

One or more embodiments of the present disclosure provide that the formulated polyol compositions can include one or more additional components. Different additional components and/or different amounts of the additional components may be utilized for various applications. Examples of additional components include pigments, colorants, antioxidants, bioretardant agents, and combinations thereof, among others. Various amounts of the additional component may be utilized for different applications.

The present disclosure provides foam formulations including the formulated polyol compositions disclosed herein and an isocyanate. The isocyanate may be a polyisocyanate. As used herein, "polyisocyanate" refers to a molecule having an average of greater than 1.0 isocyanate groups per molecule, e.g. an average functionality of greater than 1.0.

The isocyanate can be an aliphatic polyisocyanate, a cycloaliphatic polyisocyanate, an araliphatic polyisocyanate, an aromatic polyisocyanate, or combinations thereof, for example. Examples of isocyanates include, but are not limited to, polymethylene polyphenylisocyanate, toluene 2,4-/2,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanateIIPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate can be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

As mentioned, the isocyanate can have an average functionality of greater than 1.0 isocyanate groups per molecule. For instance, the isocyanate can have an average functionality from 1.5 to 8.0. All individual values and subranges from 1.5 to 8.0 are included; for example, the isocyanate can have an average functionality from a lower limit of 1.5, 1.7, 2.0, 2.3, 2.5, 2.7, or 3.0 to an upper limit of 8.0, 7.5, 7.0, 6.7, 6.5, 6.3, 6.0, 5.7 or 5.5.

The isocyanate can have an isocyanate equivalent weight 80 g/eq to 500 g/eq. All individual values and subranges from 80 to 500 g/eq are included; for example, the isocyanate can have an isocyanate equivalent weight from a lower limit of 80, 82, 84, 90, or 100 to an upper limit of 500, 450, 400, 375, or 350 g/eq.

The isocyanate may be prepared by a known process. For instance, the polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, VORACOR™, such as VORACOR™ CL 100, and PAPI™, such as PAPI™ 23 and PAPI™ 27, available from The Dow Chemical Company, among other commercial isocyanates.

The isocyanate can be utilized such that the foam formulation has an isocyanate index in a range from 55 to 110. Isocyanate index can be determined as a quotient, multiplied by one hundred, of an actual amount of isocyanate utilized and a theoretical amount of isocyanate for curing. All individual values and subranges from 55 to 110 are included; for example, the foam formulation can have an isocyanate index from a lower limit of 55, 60, 65, 67, or 69 to an upper limit of 110, 100, or 90.

The foam formulations disclosed herein can be cured to form a foam product. The foam products can be prepared using known methods and conditions, which may vary for different applications.

As mentioned, the foam products have a combination of properties that that are advantageous for a number of applications, e.g., cushions and pillows. For instance, the foam products disclosed herein can desirably provide a combination of properties including forming a skin, filling a mold via foaming, having particular foam core recovery times, particular airflow rates, e.g. skin and core airflow rates, and particular compression sets at 90% compression.

For a number applications, it is critical that the foam formulations are able to form a skin. Foam formulations that are unable to form a skin can result in undesirably defective foam products. Advantageously, the foam formulations disclosed herein are able to form a skin to provide desirable foam products. The advantages of forming a skin are evident to those in the art and forming a skin may be readily determined by visual observation.

For a number applications, it is critical that the foam formulations are able to fill a mold via foaming. Foam formulations that are unable to fill a mold via foaming can result in undesirably defective foam products. Advantageously, the foam formulations disclosed herein are able to fill a mold via foaming to provide desirable foam products. The advantages of filling the mold are evident to those in the art and filling of a mold may be readily determined by visual observation.

The foam products disclosed herein may have a foam core recovery time from 2 seconds to 120 seconds. A foam core recovery time from 2 seconds to 120 seconds indicates that the foam product has a desirable viscoelasticity, e.g., the foam product exhibits both viscous and elastic characteristics when undergoing deformation. All individual values and subranges from 2.0 to 120 seconds are included; for example, the foam product can have a foam core recovery time from a lower limit of 2.0, 2.3, or 2.5 seconds to an upper limit of 120, 90, or 60 seconds.

The foam products disclosed herein may advantageously have a skin airflow rate of 4.0 cubic feet per minute (cfm) or greater. For instance, the foam products may have a skin airflow rate from a lower limit of 4.0 cfm to an upper limit of 8.0 cfm. Skin airflow rate can be determined according to ASTM D3574; this airflow rate can be determined with the foam skin remaining on the foam. Herein, a skin airflow rate of 4.0 cubic feet per minute (cfm) or greater indicates that the foam product is chemically perforated. One or more embodiments provide that the skin airflow rate is preferably 5.0 cfm or greater.

The foam products disclosed herein may advantageously have a core airflow rate of 4.0 cubic feet per minute (cfm) or greater. For instance, the foam products may have a core airflow rate from a lower limit of 4.0 cfm to an upper limit of 14.0 cfm. Core airflow rate can be determined according to ASTM D3574; this airflow rate can be determined with a foam skin removed from the foam. One or more embodiments provide that the core airflow rate is preferably 5.0 cfm or greater. Optimally, the core airflow rate is 6.5 cfm or greater, or 7.0 cfm or greater.

The foam products disclosed herein may advantageously have a compression set at 90% compression from 1% to 12%. Compression set is a measure of the permanent deformation of the foam product after it has been compressed between two metal plates under controlled time and temperature condition, The foam product is compressed to a thickness given as a percentage of its original thickness that remained "set." All individual values and subranges from 1% to 12% are included; for example, the foam product can have a compression set at 90% compression from a lower limit of 1, 1.5, or 2% to an upper limit of 12, 10, or 9.5%. Compression set at 90% compression may be determined according to ASTM D3574 Test D.

The foam product disclosed herein may be an open-cell foam. As used herein, a "open-cell foam" refers to a foam having a core airflow rate of 0.75 cubic feet per minute (cfm) or greater. Open-cell foams are desirable for a number of applications.

The foam products disclosed herein can have one or more desirable properties. For instance, the foam products disclosed herein can have a density from 1.2 to 3.0 pounds per cubic foot (pcf). All individual values and subranges from 1.2 to 3.0 pcf are included; for example, the foam product can have a density from a lower limit of 1.2, 1.5, 1.8, 2.0, 2.05, or 2.1 pcf to an upper limit of 3.0, 2.8, or 2.7 pcf.

The foam products disclosed herein can have a compression force deflection (25%) from 1.0 to 2.0 kPa. All individual values and subranges from 1.0 to 2.0 kPa are included; for example, the foam product can have a compression force deflection (25%) from a lower limit of 1.0, 1.1, or 1.2 kPa to an upper limit of 2.0, 1.9, or 1.85 kPa.

The foam products disclosed herein can have a compression force deflection (40%) from 1.3 to 3.5 kPa. All individual values and subranges from 1.3 to 3.5 kPa are included; for example, the foam product can have a compression force deflection (40%) from a lower limit of 1.3, 1.4, or 1.5 kPa to an upper limit of 3.5, 3.4, or 3.3 kPa.

The foam products disclosed herein can have a compression force deflection (65%) from 2.5 to 20.0 kPa. All individual values and subranges from 2.5 to 20.0 kPa are included; for example, the foam product can have a compression force deflection (65%) from a lower limit of 2.5, 2.7, or 30 kPa to an upper limit of 20.0, 18.0, or 15.0 kPa.

In contrast to previous materials, which may be mechanically perforated to provide more comfort, the foam products disclosed herein may be referred to as chemically perforated. Chemically perforated foam products as disclosed herein may have an average hole diameter, e.g., holes in the formed skin, from 50 to 500 µm. All individual values and subranges from 50 to 500 µm are included; for example, chemically perforated foam products can have an average hole diameter from a lower limit of 50, 75, 100, 150, 175, or 200 µm to an upper limit of 500, 475, 450, 425, 400, 375, 350, 325, or 300 µm.

Chemically perforated foam products as disclosed herein may have an average hole coverage percentage, e.g., a percentage of total surface area of the foam product occupied by holes (chemical perforations) in the formed skin, from 50 to 85 percent. All individual values and subranges from 50 to 85 percent are included; for example, chemically perforated foam products can have an average hole coverage percentage from a lower limit of 50, 55, 60, 62, or 65 percent to an upper limit of 85, 83, or 80 percent. Average hole coverage percentage can be determined by microscopic observation, for example.

Chemically perforated foam products as disclosed herein may have an average skin coverage percentage, e.g., a percentage of total surface area of the foam product occupied by the formed skin, from 15 to 50 percent. All individual values and subranges from 15 to 50 percent are included; for example, chemically perforated foam products can have an average skin coverage percentage from a lower limit of 15, 17, or 20 percent to an upper limit of 50, 45, 40, 38, or 35 percent. The sum of average skin coverage percentage and average hole coverage percentage will be 100 percent.

The foam products disclosed herein may advantageously have an improved interface temperature, i.e. a relativity lower interface temperature, as compared to other materials. Interface temperature refers to a temperature between a person and the foam product. A relativity lower interface temperature can provide that a foam product, e.g., when utilized as a pillow, is desirably more comfortable, as compared to materials having a greater interface temperature.

The foam products disclosed herein may advantageously have an improved interface relative humidity, i.e. a lower interface relative humidity, as compared to other materials. Interface relative humidity refers to a relative humidity between a person and the foam product. A lower interface relative humidity can provide that a foam product, e.g., when utilized as a pillow, is desirably more comfortable, as compared to materials having a greater interface relative humidity.

The foam products disclosed herein may advantageously have an improved wicking time, i.e. a lower wicking time, as compared to other materials. Wicking time refers to a time for water to disappear from the surface of the foam product. A lower wicking time can provide that a foam product, e.g., when utilized as a pillow, is desirably more comfortable, as compared to materials having a greater wicking time.

EXAMPLES

In the Examples, various terms and designations for materials are used including, for instance, the following: VORANOL™ WK 3140 (first polyether polyol; EO content 60%; average hydroxyl functionality 3.0; average hydroxyl number 167 mg KOH/g; number average molecular weight 1000 g/mol; obtained from the Dow Chemical Company); VORANOL™ 2070 (fourth polyether polyol; average hydroxyl functionality 3.0; average hydroxyl number 237 mg KOH/g; number average molecular weight 708 g/mol; all propylene oxide based, obtained from the Dow Chemical Company); VORANOL™ 3136 (third polyether polyol; average hydroxyl functionality 3.0; average hydroxyl number 56.4 mg KOH/g; number average molecular weight 3000 g/mol; ethylene oxide content 8 weight percent, obtained from the Dow Chemical Company); VORANOL™ CP-1447 (second polyether polyol; average hydroxyl functionality 3.0; average hydroxyl number 37 mg KOH/g; number average molecular weight 4500 g/mol; ethylene oxide content 78 weight percent; obtained from the Dow Chemical Company); CARBOWAX™ MPEG 550 (methoxypolyethylene glycol; average hydroxyl functionality 1.0; average hydroxyl number 102 mg KOH/g; number average molecular weight 550 g/mol; obtained from the Dow Chemical Company); CARBOWAX™ PEG 600 (commercial polyethylene glycol; average hydroxyl functionality 2.0; average hydroxyl number 190 mg KOH/g; number average molecular weight 600 g/mol; obtained from the Dow Chemical Company); IP 625 (commercial polyol; average hydroxyl functionality 3.0; average hydroxyl number 270 mg KOH/g; number average molecular weight 623 g/mol; all ethylene oxide based, obtained from the Dow Chemical Company); VORANOL™ CP-3001 (commercial polyol, average hydroxyl functionality 3.0; average hydroxyl number 56.4 mg KOH/g; number average molecular weight 3000 g/mol; capped with ethylene oxide 8.5%, primary hydroxyl content of 54 mole %, obtained from the Dow Chemical Company); NIAX L-620 (organosilicone surfactant; obtained from Momentive); DABCO 33-LV (gel catalyst; obtained from Evonik); DABCO BL-17 (blowing catalyst; obtained from Evonik); PAPI™ 23 (isocyanate; polymethylene polyphenylisocyanate that contains MDI; obtained from the Dow Chemical Company).

Example (EX) 1, a formulated polyol composition, was prepared as follows. For Example 1, the formulated polyol composition components listed in Table 1, with the exception of catalyst which as added following the first mixing, were combined in a mixing container by mixing utilizing a 6-pin mixer at 800 rpm for 15 seconds and at 2400 rpm for 15 seconds; then the catalyst was added to contents of the mixing container, which were mixed at 2400 rpm for 15 seconds. Example 2-6 were prepared as Example 1 with the changes that the items indicated in Table 1 were respectively utilized.

Example 7, a foam formulation, was prepared as follows. Isocyanate was added to Example 1 and mixed 3000 rpm for 3 seconds; the isocyanate index is listed in Table 1. Examples 8-12 were prepared as Example 7, with the changes that Examples 2-6 were respectively utilized rather than Example 1 and the changes that the items indicated in Table 1 were respectively utilized.

Example 13, a foam product, was prepared as follows. Example 7 was poured into a plastic lined container (38 cm×38 cm×24 cm) for foaming and curing for approximately 12 hours at approximately 20° C. to provide Example 13. Examples 14-18 were prepared as Example 13 with the changes that Examples 8-12 were respectively utilized rather than Example 7.

Comparative Examples (CE) A-S were prepared as Examples 1-6, with the change that the items indicated in the following Tables were respectively utilized.

Comparative Examples A*-S*, foam formulations, were prepared as Example 7, with the changes that Comparative Examples A-P were respectively utilized rather than Example 1.

Comparative Examples A-S, foam products, were prepared as were prepared as Example 13, with the changes that Comparative Examples A*-P* were respectively utilized rather than Example 7.

A number of properties were determined for Examples and Comparative Examples and are reported in the following Tables.

Foam core recovery was determined using a RESIMAT (Messtechnik GmbH, Germany); respective samples (4-inch×4-inch×2-inch) were compressed to a strain level of 78% using a pressure plate and held for 60 seconds, after 60 seconds, the electro-magnets released the pressure plate and allowed the foam to recover at least 90% of its original uncompressed height. The recovery time at 90% recovery is reported as the foam core recovery time.

Compression Force Deflection was determined according to ASTM D3574-08.

Airflow rates, both skin and core, were determined according to ASTM D3574 and are reported in cubic feet per minute (cfm). Respective samples (2-inch×1-inch×1-inch); three specimens per sample were tested and the average is reported. For the skin airflow rate, samples were tested with the foam skin remaining. For the core airflow rate, samples were tested with the foam skin removed, i.e. the foam core was tested. For mechanically perforated Comparative Examples, four holes, each having a 6 mm diameter, were punched through each sample; the punched holes were symmetrically arranged, and each punched hole was located near a corner of the sample. For Comparative Examples for which airflow as determined, Comparative Examples C, D, N, and P were mechanically perforated and Comparative Examples F, J, and M** were not mechanically perforated.

Compression set at 90% compression was determined according to ASTM D3574 Test D.

TABLE 1

| | Formulated Polyol Compositions | | | | | |
|---|---|---|---|---|---|---|
| | Ex 1 | Ex 2 | Ex 3 | Ex 4 | Ex 5 | Ex 6 |
| VORANOL ™ WK 3140 | 34.89 | 43.18 | 43.18 | 51.26 | 48.25 | 35.58 |
| VORANOL ™ CP-1447 | 8.08 | 10.00 | 10.00 | 11.87 | 11.17 | 25.00 |
| VORANOL ™ 3136 | 32.00 | 17.00 | 17.00 | 20.18 | 19.00 | 14.01 |
| VORANOL ™ 2070 | 12.12 | 15.00 | 15.00 | — | 16.76 | 12.36 |
| CARBOWAX ™ MPEG 550 | 8.08 | 10.00 | 10.00 | 11.87 | — | 8.24 |
| Water | 3.30 | 3.30 | 3.30 | 3.30 | 3.30 | 3.30 |
| NIAX L-620 | 1.00 | 1.00 | 1.00 | 1.00 | 1.00 | 1.00 |
| DABCO BL-17 | 0.20 | 0.20 | 0.20 | 0.20 | 0.20 | 0.20 |
| DABCO 33-LV | 0.32 | 0.32 | 0.32 | 0.32 | 0.32 | 0.32 |
| Ethylene oxide content based upon total weight of polyol and glycol | 37% | 44% | 44% | 53% | 39% | 50% |

| | Foam Formulations | | | | | |
|---|---|---|---|---|---|---|
| | Ex 7 | Ex 8 | Ex 9 | Ex 10 | Ex 11 | Ex 12 |
| PAPI ™ 23 (isocyanate index) | 71 | 71 | 71 | 71 | 71 | 71 |

| | Foam Products | | | | | |
|---|---|---|---|---|---|---|
| | Ex 13 | Ex 14 | Ex 15 | Ex 16 | Ex 17 | Ex 18 |
| Skin formation visually observed | Yes | Yes | Yes | Yes | Yes | Yes |
| Foaming, visually observed | Good foam filled mold | Good foam filled mold | Good foam filled mold | Good foam filled mold | Good foam filled mold | Good foam filled mold |
| Foam core recovery (seconds) | 40 | 6.6 | 3.7 | 6.0 | 11.3 | 2.6 |

TABLE 1-continued

|  |  |  |  |  |  |  |
|---|---|---|---|---|---|---|
| Compression Force Deflection 25% (kPa) | 1.6 | 1.5 | 1.3 | 1.8 | 1.7 | 1.6 |
| Compression Force Deflection 40% (kPa) | 2.2 | 1.9 | 1.7 | 2.8 | 2.2 | 2.7 |
| Compression Force Deflection 65% (kPa) | 5.3 | 4.5 | 3.4 | 7.5 | 5.6 | 14.3 |
| Skin airflow rate (cfm) | 5.5 | 5.3 | 5.9 | 5.9 | 5.0 | 5.0 |
| Core airflow rate (cfm) | 7.1 | 8.8 | 7.3 | 8.6 | 7.0 | 9.6 |
| Compression set 90% (%) | 8.8 | 4.2 | 5.2 | 6.1 | 5.1 | 6.0 |
| Density (pcf) | 2.17 | 2.47 | 2.62 | 2.35 | 2.29 | 2.27 |

The data of Table 1 illustrates each of Examples 13-18 advantageously: formed a skin; filled the mold via foaming; had a foam core recovery time from 2 second to 120 seconds; had a skin airflow rate of 4.0 cubic feet per minute (cfm) or greater; had a core airflow rate of 4.0 cubic feet per minute (cfm) or greater; and have a compression set at 90% compression from 1% to 12%.

TABLE 2

| | Formulated Polyol Compositions | | | | | | |
|---|---|---|---|---|---|---|---|
| | CE A | CE B | CE C | CE D | CE E | CE F | CE G |
| VORANOL ™ WK 3140 | 5.00 | 15.00 | 3.18 | — | — | 34.43 | 43.18 |
| VORANOL ™ CP-1447 | 20.18 | 20.18 | 50.00 | 20.00 | 10.00 | 1.25 | 10.00 |
| VORANOL ™ 3136 | 20.00 | 20.00 | 17.00 | 17.00 | 17.00 | 8.25 | — |
| VORANOL ™ 2070 | 40.00 | 40.00 | 15.00 | 38.18 | 15.00 | 50.00 | 19.25 |
| CARBOWAX ™ MPEG 550 | 10.00 | 10.00 | 10.00 | 10.00 | 10.00 | 1.25 | 14.25 |
| IP 625 | — | — | — | — | 43.18 | — | — |
| CARBOWAX ™ PEG 600 | — | — | — | 10.00 | — | — | — |
| Water | 3.30 | 3.30 | 3.30 | 3.30 | 3.30 | 3.30 | 3.30 |
| NIAX L-620 | 1.00 | 1.00 | 1.00 | 1.00 | 1.00 | 1.00 | 1.00 |
| DABCO BL-17 | 0.20 | 0.20 | 0.20 | 0.20 | 0.20 | 0.20 | 0.20 |
| DABCO 33-LV | 0.32 | 0.32 | 0.32 | 0.32 | 0.32 | 0.32 | 0.32 |
| Ethylene oxide content based upon total weight of polyol and glycol | 30% | 36% | 52% | 36% | 22% | 23% | 47% |

| | Foam Formulations | | | | | | |
|---|---|---|---|---|---|---|---|
| | CE A* | CE B* | CE C* | CE D* | CE E* | CE F* | CE G* |
| PAPI ™ 23 (isocyanate index) | 71 | 71 | 71 | 71 | 71 | 71 | 71 |

| | Foam Products | | | | | | |
|---|---|---|---|---|---|---|---|
| | CE A** | CE B** | CE C** | CE D** | CE E** | CE F** | CE G** |
| Skin formation visually observed | Yes | Yes | Yes | Yes | Yes | Yes | Yes |
| Foaming, visually observed | Foam collapsed | Foam collapsed | Did not fill mold | Good foam filled mold | Good foam filled mold | Good foam fil ledmold | Foam shrank |
| Foam core recovery (seconds) | NA (foam collapsed) | NA (foam collapsed) | 1.7 | 29.3 | 18.8 | 40.0 | NA (foam shrank) |
| Compression Force Deflection 25% (kPa) | NA (foam collapsed) | NA (foam collapsed) | 1.8 | 1.5 | 2.0 | 1.9 | NA (foam shrank) |
| Compression Force Deflection 40% (kPa) | NA (foam collapsed) | NA (foam collapsed) | 3.1 | 2.1 | 2.3 | 2.6 | NA (foam shrank) |

TABLE 2-continued

| | | | | | | | |
|---|---|---|---|---|---|---|---|
| Compression Force Deflection 65% (kPa) | NA (foam collapsed) | NA (foam collapsed) | 19.4 | 5.8 | 4.1 | 6.1 | NA (foam shrank) |
| Skin airflow rate (cfm) | NA (foam collapsed) | NA (foam collapsed) | 7.8 | 3.7 | 3.6 | 0.1 | NA (foam shrank) |
| Core airflow rate (cfm) | NA (foam collapsed) | NA (foam collapsed) | 11.2 | 4.7 | 6.0 | 0.1 | NA (foam shrank) |
| Compression set 90% (%) | NA (foam collapsed) | NA (foam collapsed) | 6.4 | 55.4 | 0.7 | 5.2 | NA (foam shrank) |
| Density (pcf) | NA (foam collapsed) | NA (foam collapsed) | 2.20 | 2.16 | 2.49 | 2.62 | NA (foam shrank) |

TABLE 3

| | Formulated Polyol Compositions | | | | | | |
|---|---|---|---|---|---|---|---|
| | CE H | CE I | CE J | CE K | CE L | CE M | CE N |
| VORANOL ™ WK 3140 | 50.00 | 55.00 | 43.18 | 51.47 | 26.61 | 27.02 | 48.25 |
| VORANOL ™ CP-1447 | 10.00 | 10.00 | 10.00 | 11.92 | 6.16 | 6.26 | — |
| VORANOL ™ 3136 | 10.18 | 10.18 | — | 2.00 | 47.00 | 10.64 | 19.00 |
| VORANOL ™ 2070 | 15.00 | 15.00 | 15.00 | 17.88 | 9.24 | 45.00 | 16.76 |
| VORANOL ™ CP 3001 | — | — | 17.00 | — | — | — | — |
| CARBOWAX ™ MPEG 550 | 10.00 | 10.00 | 10.00 | 11.92 | 6.16 | 6.26 | 11.17 |
| IP 625 | — | — | — | — | — | — | — |
| CARBOWAX ™ PEG 600 | — | — | — | — | — | — | — |
| Water | 3.30 | 3.30 | 3.30 | 3.30 | 3.30 | 3.30 | 3.30 |
| NIAX L-620 | 1.00 | 1.00 | 1.00 | 1.00 | 1.00 | 1.00 | 1.00 |
| DABCO BL-17 | 0.20 | 0.20 | 0.20 | 0.20 | 0.20 | 0.20 | 0.20 |
| DABCO 33-LV | 0.32 | 0.32 | 0.32 | 0.32 | 0.32 | 0.32 | 0.32 |
| Ethylene oxide content based upon total weight of polyol and glycol | 48% | 51% | 45% | 52% | 30% | 28% | 41% |

| | Foam Formulations | | | | | | |
|---|---|---|---|---|---|---|---|
| | CE H* | CE I* | CE J* | CE K* | CE L* | CE M* | CE N* |
| PAPI ™ 23 (isocyanate index) | 71 | 71 | 71 | 71 | 71 | 71 | 71 |

| | Foam Products | | | | | | |
|---|---|---|---|---|---|---|---|
| | CE H** | CE I** | CE J** | CE K** | CE L** | CE M** | CE N** |
| Skin formation visually observed | No | No | Yes | Yes | Yes | Yes | Yes |
| Foaming, visually observed | NA (no skin formation) | NA (no skin formation) | Good foam filled mold | Foam collapsed | Foam collapsed | Good foam filled mold | Good foam filled mold |
| Foam core recovery (seconds) | NA (no skin formation) | NA (no skin formation) | 25.2 | NA (foam collapsed) | NA (foam collapsed) | 40.0 | 10.8 |
| Compression Force Deflection 25% (kPa) | NA (no skin formation) | NA (no skin formation) | 1.4 | NA (foam collapsed) | NA (foam collapsed) | 2.2 | 1.6 |
| Compression Force Deflection 40% (kPa) | NA (no skin formation) | NA (no skin formation) | 1.7 | NA (foam collapsed) | NA (foam collapsed) | 3.1 | 2.4 |
| Compression Force Deflection 65% (kPa) | NA (no skin formation) | NA (no skin formation) | 3.0 | NA (foam collapsed) | NA (foam collapsed) | 9.9 | 10.7 |

TABLE 3-continued

| | | | | | | | |
|---|---|---|---|---|---|---|---|
| Skin airflow rate (cfm) | NA (no skin formation) | NA (no skin formation) | 0.9 | NA (foam collapsed) | NA (foam collapsed) | 0.4 | 4.2 |
| Core airflow rate (cfm) | NA (no skin formation) | NA (no skin formation) | 0.9 | NA (foam collapsed) | NA (foam collapsed) | 1.2 | 7.5 |
| Compression set 90% (%) | NA (no skin formation) | NA (no skin formation) | 83.1 | NA (foam collapsed) | NA (foam collapsed) | 87.9 | 16.3 |
| Density (pcf) | NA (no skin formation) | NA (no skin formation) | 2.18 | NA (foam collapsed) | NA (foam collapsed) | 2.45 | 2.32 |

TABLE 4

| | Formulated Polyol Compositions | | | | |
|---|---|---|---|---|---|
| | CE O | CE P | CE Q | CE R | CE S |
| VORANOL ™ WK 3140 | 38.11 | 35.10 | 51.26 | 63.13 | 45.00 |
| VORANOL ™ CP-1447 | 8.83 | 8.13 | 23.74 | 11.87 | 27.12 |
| VORANOL ™ 3136 | 15.00 | 13.82 | 20.18 | 20.18 | 23.06 |
| VORANOL ™ 2070 | 13.24 | 30.00 | — | — | — |
| VORANOL ™ CP 3001 | — | — | — | — | — |
| CARBOWAX ™ MPEG 550 | 20.00 | 8.13 | 51.26 | 63.13 | 45.00 |
| IP 625 | — | — | — | — | — |
| CARBOWAX ™ PEG 600 | — | — | — | — | — |
| Water | 3.30 | 3.30 | 3.30 | 3.30 | 3.30 |
| NIAX L-620 | 1.00 | 1.00 | 1.00 | 1.00 | 1.00 |
| DABCO BL-17 | 0.20 | 0.20 | 0.20 | 0.20 | 0.20 |
| DABCO 33-LV | 0.32 | 0.32 | 0.32 | 0.32 | 0.32 |
| Ethylene oxide content based upon total weight of polyol and glycol | 50% | 36% | 51% | 49% | 50% |

| | Foam Formulations | | | | |
|---|---|---|---|---|---|
| | CE O* | CE P* | CE Q* | CE R* | CE S* |
| PAPI ™ 23 (isocyanate index) | 71 | 71 | 71 | 71 | 71 |

| | Foam Products | | | | |
|---|---|---|---|---|---|
| | CE O** | CE P** | CE Q** | CE R** | CE S** |
| Skin formation visually observed | No | Yes | Yes | Yes | Yes |
| Foaming, visually observed | NA (no skin formation) | Good foam filled mold | Good foam filled mold | Good foam filled mold | Good foam filled mold |
| Foam core recovery (seconds) | NA (no skin formation) | 13.8 | 1.5 | 2.7 | 1.6 |
| Compression Force Deflection 25% (kPa) | NA (no skin formation) | 1.7 | 1.7 | 1.8 | 1.4 |
| Compression Force Deflection 40% (kPa) | NA (no skin formation) | 2.1 | 2.0 | 2.1 | 1.7 |
| Compression Force Deflection 65% (kPa) | NA (no skin formation) | 4.6 | 3.3 | 3.5 | 3.0 |
| Skin airflow rate (cfm) | NA (no skin formation) | 2.5 | 2.7 | 2.8 | 3.0 |

TABLE 4-continued

| | | | | | |
|---|---|---|---|---|---|
| Core airflow rate (cfm) | NA (no skin formation) | 2.6 | 2.5 | 2.5 | 3.5 |
| Compression set 90% (%) | NA (no skin formation) | 24.7 | 1.1 | 1.0 | 1.0 |
| Density (pcf) | NA (no skin formation) | 2.32 | 2.4 | 2.6 | 2.5 |

The data of Tables 2-4 illustrates that, in contrast to each of Examples 13-18, none of Comparative Examples A-S were able provide the advantageous combination of properties as illustrated in Table 1. None of Comparative Examples A-S were able to provide: a formed skin; a filled mold via foaming; a foam core recovery time from 2 second to 120 seconds; a skin airflow rate of 4.0 cubic feet per minute (cfm) or greater; a core airflow rate of 4.0 cubic feet per minute (cfm) or greater; and a compression set at 90% compression from 1% to 12%.

Examples 20-21, formulated polyol compositions, were prepared as Examples 1-6, with the change that the items indicated in Table 5 were respectively utilized.

Examples 22-23, foam formulations, were prepared with a Cannon A40 high-pressure machine, as discussed further below. The isocyanate index is listed in Table 5.

Examples 24-25, foam products, were prepared respectively utilizing Examples 22-23 and a Cannon A40 high-pressure machine equipped with a 14 mm FPL mixing head. Examples 22-23 were respectively poured into an aluminum pillow mold. The cavity volume of the mold was approximately 1.4 ft³. The temperature of the mold was controlled by resistance heating. A water based molded release was applied to the mold before each pour. The set condition of the machine was: a mold temperature of 120° F.; formulated polyol composition temperature of 77° F.; isocyanate temperature of 77° F.; throughput of 170 g/s; formulated polyol composition pressure of 170 bar; isocyanate pressure of 170 bar; demold time of 210 seconds (3 minutes to vent, 3.5 minutes to take out); formulated polyol composition specific gravity of 1.04; isocyanate specific gravity of 1.23; formulated polyol composition orifice of 1.5 mm; isocyanate orifice of 0.8 mm. A number of properties were determined, as previously discussed, for Examples 24-25. The results are reported in Table 5.

TABLE 5

| | Formulated Polyol Compositions | |
|---|---|---|
| | Ex 20 | Ex 21 |
| VORANOL™ WK 3140 | 43.18 | 43.18 |
| VORANOL™ CP-1447 | 10.00 | 10.00 |
| VORANOL™ 3136 | 17.00 | 17.00 |
| VORANOL™ 2070 | 15.00 | 15.00 |
| CARBOWAX™ MPEG 550 | 10.00 | 10.00 |
| Water | 3.30 | 3.30 |
| NIAX L-620 | 1.00 | 1.00 |
| DABCO BL-17 | 0.20 | 0.20 |
| DABCO 33-LV | 0.32 | 0.32 |
| Ethylene oxide content based upon total weight of polyol and glycol | 45.3% | 45.3% |
| | Foam Formulations | |
| | Ex 22 | Ex 23 |
| PAPI™ 23 (isocyanate index) | 71 | 80 |
| | Foam Products | |
| | Ex 24 | Ex 25 |
| Skin formation visually observed | Yes | Yes |
| Foaming, visually observed | Good foam filled mold | Good foam filled mold |
| Foam core recovery (seconds) | 9.9 | 8.5 |
| Compression Force Deflection 25% (kPa) | 2.17 | 1.92 |
| Compression Force Deflection 40% (kPa) | 2.52 | 2.17 |
| Compression Force Deflection 65% (kPa) | 4.12 | 3.64 |
| Skin airflow rate (cfm) | 5.14 | 5.28 |
| Core airflow rate (cfm) | 6.85 | 7.21 |
| Compression set 90% (%) | 2.08 | 2.21 |
| Density (pcf) | 2.43 | 2.47 |

The data of Table 5 illustrates each of Examples 24-25 advantageously: formed a skin; filled the mold via foaming; had a foam core recovery time from 2 second to 120 seconds; had a skin airflow rate of 4.0 cubic feet per minute (cfm) or greater; had a core airflow rate of 4.0 cubic feet per minute (cfm) or greater; and have a compression set at 90% compression from 1% to 12%.

Interface temperatures and interface relative humidity levels at the interface between Examples 24-25, as well as a number of commercially obtained pillows, and human skin was determined as follows. A temperature/humidity sensor was respectively inserted between a person's head and Examples 24-25, as well as the commercially obtained pillows; temperatures and relative humidity levels were determined after 60 minutes. Examples 24-25 and the commercially obtained pillows were each respectively covered with a cotton (55%)/polyester cover (45%) woven fabric cover having a fabric density of 0.18 kg/m². The results are reported in Table 6.

Wiking times for Examples 24-25 and the commercially obtained pillows were determined by was determined by placing a drop of dyed water the respective surfaces of samples (thickness of 1.0 inch) of Examples 24-25 and the commercially obtained pillows. The time at which it takes for the drops of water to disappear from the surface is visually observed and recorded as the wicking time. The results are reported in Table 6.

The commercially obtained pillows were: pillow 1 (latex pillow from Organic Textiles; 100% latex material, skin airflow rate 10 cfm; core airflow rate 11 cfm; density 2.1 pcf; compression set 90% of 6.2%); pillow 2 (Dream Serenity Ergo Shape Comfort from Sinomax; density 2.76 pcf); pillow 3 (The Big One Gel Memory Foam from Kohl's; 10 weight percent of gel particles; density 2.3 pfc); pillow 4 (gel coated pillow from Pharmedoc; density 2.45 pcf); pillow 5 (phase change material coated pillow; density 2.5 pcf). The commercially obtained pillows were mechanically perforated as discussed herein.

Examples 24-25 were chemically performed as discussed herein and had an average hole diameter of approximately 250 μm; an average hole coverage percentage of approximately 79 percent and have an average skin coverage percentage of approximately 21 percent. The mechanically perforated materials had an average hole diameter of approximately 6.0 mm; an average hole coverage percentage of approximately 6.9 percent and have an average skin coverage percentage of approximately 93.1 percent.

TABLE 6

| | Interface temperature | Interface relative humidity | Wicking time |
|---|---|---|---|
| Ex 24 | 98.2° F. | 52.0% | 1 second |
| Ex 25 | 98.4° F. | 52.0% | 1 second |
| Pillow 1 | — | — | No wicking |
| Pillow 2 | 98.5° F. | 56.0% | 2 seconds |
| Pillow 3 | 99.0° F. | 57.0% | 4 seconds |
| Pillow 4 | 98.9° F. | 61.0% | No wicking |
| Pillow 5 | 99.0° F. | 57.0% | No wicking |

The data of Table 6 illustrates Examples 24-25 had an advantageously improved interface temperature, i.e. a relativity lower interface temperature, as compared to each of commercially obtained Pillows 2-5. A relativity lower interface temperature can provide that a pillow is desirably more comfortable, as compared to pillows having a greater interface temperature.

The data of Table 6 illustrates Examples 24-25 had an advantageously improved interface relative humidity, i.e. a lower interface relative humidity, as compared to each of commercially obtained Pillows 2-5. A lower interface relative humidity can provide that a pillow is desirably more comfortable, as compared to pillows having a greater interface relative humidity.

The data of Table 6 illustrates Examples 24-25 had an advantageously improved wicking time, i.e. a relativity lower wicking time, as compared to each of commercially obtained Pillows 1-5. A lower wicking time can provide that a pillow is desirably more comfortable, as compared to pillows having a greater wicking time.

What is claimed:

1. A formulated polyol composition comprising:
   a first polyether polyol having an average hydroxyl number from 112 to 280 mg KOH/g and an ethylene oxide content of 45 to 70 weight percent based upon a total weight of the first polyether polyol, wherein the first polyether polyol is from 20 to 55 weight percent of the formulated polyol composition based upon a total weight of the formulated polyol composition;
   a second polyether polyol having an average hydroxyl number from 18.5 to 51 mg KOH/g and an ethylene oxide content of at least 70 weight percent based upon a total weight of the second polyether polyol, wherein the second polyether polyol is from 2 to 50 weight percent of the formulated polyol composition based upon the total weight of the formulated polyol composition;
   a third polyether polyol having an average hydroxyl number from 20 to 70 mg KOH/g and a propylene oxide content of at least 70 weight percent based upon a total weight of the third polyether polyol, wherein the third polyether polyol is from 5 to 45 weight percent of the formulated polyol composition based upon the total weight of the formulated polyol composition;
   a surfactant;
   water;
   a catalyst selected from a blowing catalyst, a gel catalyst, and combinations thereof; and
   at least one of:
      a fourth polyether polyol having an average hydroxyl number from 112 to 280 mg KOH/g and a propylene oxide content of at least 70 weight percent based upon a total weight of the fourth polyether polyol, wherein the fourth polyether polyol is from 0.1 to 25 weight percent of the formulated polyol composition based upon the total weight of the formulated polyol composition; and
      a methoxypolyethylene glycol having an average hydroxyl number from 56 to 190 mg KOH/g, wherein the methoxypolyethylene glycol is from 0.1 to 15 weight percent of the formulated polyol composition based upon the total weight of the formulated polyol composition.

2. The formulated polyol composition of claim 1, wherein the fourth polyether polyol has number average molecular weight from 500 to 1200 g/mol and an average hydroxyl functionality from 2.6 to 3.4.

3. The formulated polyol composition of claim 1, wherein the methoxypolyethylene glycol has number average molecular weight from 400 to 700 g/mol and an average hydroxyl functionality from 0.6 to 1.4.

4. The formulated polyol composition of claim 1 wherein the first polyether polyol has number average molecular weight from 700 to 1300 g/mol and an average hydroxyl functionality from 2.6 to 3.4;
   the second polyether polyol has number average molecular weight from 4000 to 5000 g/mol and an average hydroxyl functionality from 2.6 to 3.4; and
   the third polyether polyol has number average molecular weight from 2000 to 4000 g/mol and an average hydroxyl functionality from 2.6 to 3.4.

5. A foam formulation comprising:
   the formulated polyol composition of claim 1; and
   an isocyanate, wherein the foam formulation has an isocyanate index 55 to 110.

6. A foam product formed by curing the foam formulation of claim 5.

7. The foam product of claim 6, wherein the foam product includes a skin, has a foam core recovery time from 2 second to 120 seconds, has a skin airflow rate of 4.0 cubic feet per minute or greater, has a core airflow rate of 4.0 cubic feet per minute or greater, and has a compression set at 90% compression from 1% to 12%.

8. The foam product of claim 6, wherein the foam product has an average hole coverage percentage from 50 to 85 percent with an average hole diameter from 50 to 500 μm.

\* \* \* \* \*